United States Patent [19]

Rangan

[11] Patent Number: 5,239,573
[45] Date of Patent: Aug. 24, 1993

[54] TELEPHONE TERMINAL INCORPORATING SPEECH SYNTHESIZER FOR ENHANCED COMMUNICATION

[75] Inventor: Srirangam Rangan, Palos Verdes, Calif.

[73] Assignee: Telecredit, Inc., Los Angeles, Calif.

[21] Appl. No.: 599,781

[22] Filed: Oct. 17, 1990

Related U.S. Application Data

[63] Continuation-in-part of Ser. No. 509,697, Apr. 16, 1990.

[51] Int. Cl.⁵ .................... H04M 1/50; H04M 11/08
[52] U.S. Cl. ....................... 379/88; 379/97; 379/201
[58] Field of Search .............. 379/88, 67, 216, 355, 379/354, 201, 97

[56] References Cited

U.S. PATENT DOCUMENTS 4,503,288  3/1985  Kessler ........................... 379/67

*Primary Examiner*—Thomas W. Brown
*Attorney, Agent, or Firm*—Nilsson, Wurst & Green

[57] ABSTRACT

In conjunction with elements of a single conventional telephone, a central processor isolates the telephone from the communications network facility to function with a voice synthesizer structure and a DTMF encoder/decoder apparatus and develop a data packet for inquiry from a terminal to a telephone inquiry processing center. On completion of the data packet, a dial-up connection is established between the terminal and the inquiry processing center for fast, efficient automated communication. Reply data is delivered through the telephone by the voice synthesizer. The control processor executes a series of switching operations to accomplish the data exchange.

9 Claims, 3 Drawing Sheets

TELEPHONE TERMINAL INCORPORATING SPEECH SYNTHESIZER FOR ENHANCED COMMUNICATION

BACKGROUND AND SUMMARY OF THE INVENTION

This is a continuation-in-part application of copending application Ser. No. 07/509,697 filed Apr. 16, 1990 entitled Synthesized Speech Terminal System for Data Communication.

In recent years, telephone systems have been expanded to encompass numerous new functions and applications. For example, various innovative applications have involved synthesized speech equipment at a central terminal to interface persons at remote terminals with computers or data processors. Specifically, guided by speech synthesizers, callers may obtain information relating to financial stock prices, accounts, recreational facility conditions and so on. Essentially, callers are interfaced with a data processor, the communication being in a digital format from the remote telephone terminal to the central computer and in an audio format from the computer to the remote terminal.

While current telephone-computer interface techniques are adequate for many applications, complex communications sometimes present difficulties. For example, current systems may require callers to accurately operate the key pad of a Touch-Tone telephone to enter fifteen or twenty digits. To pursue a specific example, after a caller is interfaced with a processor, it may be necessary to enter an account number along with other relatively large numbers containing many digits. Consequently, mistakes and delays are common. Accordingly, the interface may involve several minutes with attendant telephone time charges and computer connection. Therefore, a need exists for an effective system for improving telephonic interface communication between a remote telephone caller and a data processing apparatus. Specifically in that regard, a need exists for a system to improve communication and to reduce the telephone connection time to the data processing apparatus so as to reduce telephone charges and demands on the data processing apparatus.

In general, the present invention comprises an apparatus for use as an individual telephone for removed interface communication with a data processing apparatus as in the form of a computerized information service. In the disclosed embodiment, the terminal apparatus may be employed as a traditional telephone or to formulate and transmit inquiries to a computerized information service, then receive and announce replies. Elements of a conventional telephone are cooperatively coupled with a local processor, an off-hook sensor, memory capability, a voice synthesizer and a DTMF (dual tone multiple frequency) encoder/decoder. The processor incorporates switching capability to accommodate alternate uses of the terminal and various stages of operation. Accordingly, the terminal may be employed as a conventional telephone or may be employed to interface with an information service computer using an operating sequence that involves formulating digital data for the interface prior to the actual telephone connection. With the telephone connection, the formulated data packet is rapidly transmitted to the computer prompting reply data that is vocally announced by the terminal.

Considering the system of the present invention in somewhat greater detail, a composite terminal as disclosed herein incorporates a keypad telephone along with a voice synthesizer to function in cooperation with a speech vocabulary memory for cueing or instructing a caller according to a specific format. A DTMF encoder/decoder receives information from the telephone keypad to formulate data for an inquiry packet to the central computer system. Generally, the data is assembled as an inquiry packet before the central telephone network circuits actually communicate with the central processor. Consequently, the inquiry communication with the central processor can be prompt and concise. The resulting reply then actuates the voice synthesizer to drive the terminal telephone to effectively inform a caller accordingly. Switching capability within a control processor of the terminal accommodates the various operating phases.

BRIEF DESCRIPTION OF THE DRAWINGS

In the drawings, which constitute a part of the specification, an exemplary embodiment exhibiting various objectives and features hereof is set forth, specifically.

DESCRIPTION OF THE ILLUSTRATIVE EMBODIMENT

As required, a detailed illustrative embodiment of the present invention is disclosed herein. However, physical communication systems, data formats and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
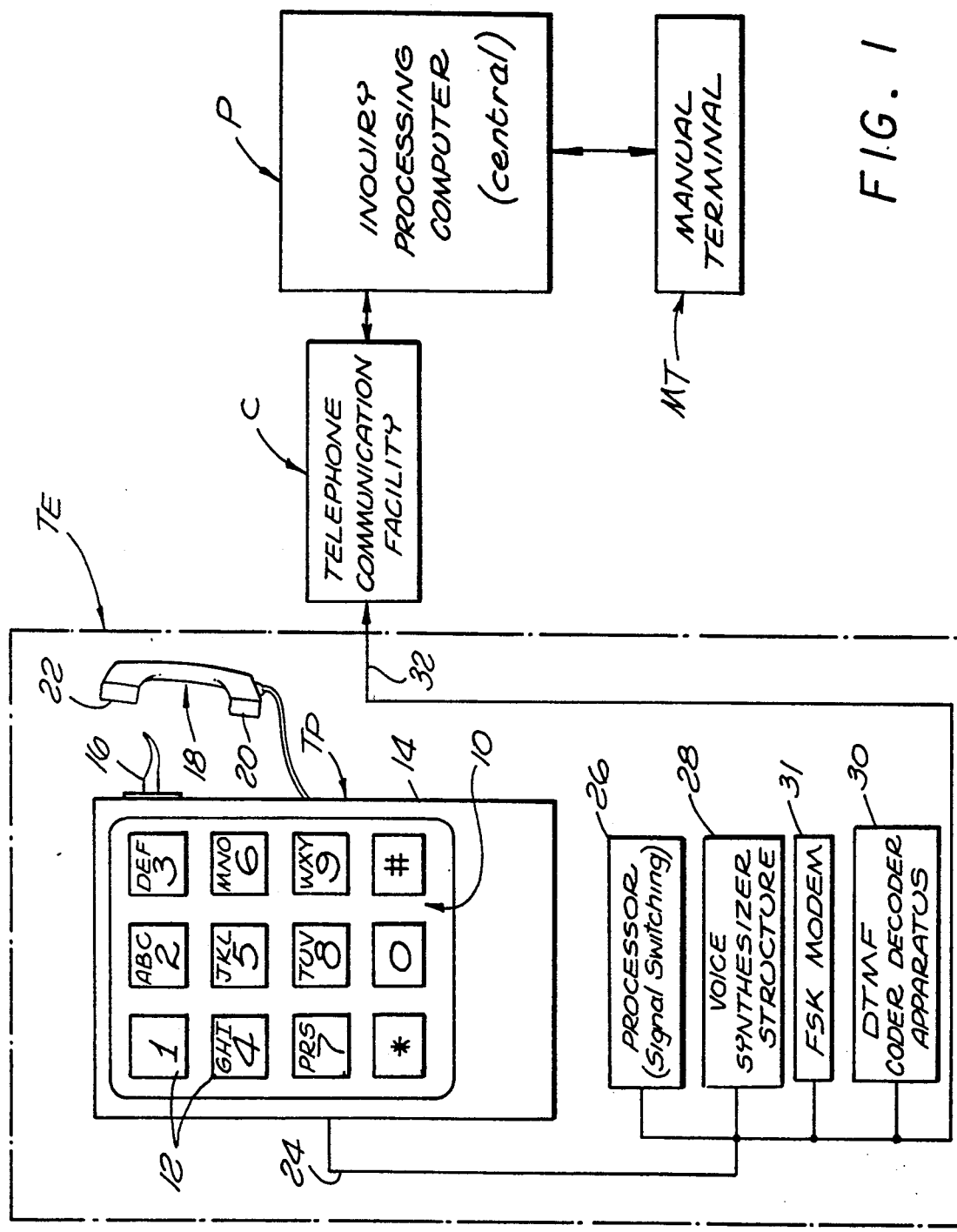
FIG. 1 is a block diagram of a system incorporating a terminal in accordance with the present invention.

Referring initially to FIG. 1, a telephone terminal TE is represented connected through a dial-up telephone communication facility C to an inquiry processing central computer P. The computer P may comprise a telephone information service and, as illustrated, has an associated manual terminal MT. Generally, the terminal TE incorporates a telephone TP that may be employed either as a conventional telephone for traditional vocal communication or to interface information services as provided by the computer P. The computer P may accommodate various inquiry formats from the terminal TE, and the terminal TE may be employed to interface with other inquiry processing computers (not shown).

To interface the computer P, an operator at the terminal TE indicates the desire for an interface and as a result is prompted to enter data for an inquiry. The data is stored in the terminal TE until an inquiry packet is complete. At that time, the terminal TE initiates a dial-up connection through the telephone communication facility C with the computer P. The inquiry packet is transmitted accurately and rapidly to the computer P. As a result, response data may be formulated by the computer P for transmission back to the terminal TE through the facility C. Within the terminal TE, the response data then actuates a voice synthesizer to announce the reply. Accordingly, the terminal TE economically accommodates the leisurely formation of inquiries, the brief and effective transmission of such inquiries through the communication facility C to the computer P and the receipt of responses for vocal delivery to the operator. Economy is accordingly accomplished by effectively reducing the interval of telephone communication with the processing computer P.

Considering the terminal TE in somewhat greater detail, the telephone TP incorporates a traditional keypad 10 incorporating the push button keys 12 to accomplish Touch-Tone dialing. The keypad 10 is mounted on a housing 14 which also supports a switch cradle 16 for receiving a handpiece 18 incorporating a microphone 20 and an earphone 22. In accordance with tradition, removing the handpiece 18 from the cradle 16 actuates the telephone TP for dial-up communication.

Within the terminal TE, the telephone TP is connected through a line 24 to other basic elements generally represented as a processor 26, a voice synthesizer 28, a DTMF encoder/decoder apparatus 30 and an FSK modem 31. As illustrated, these elements are coupled to the telephone communication facility C through a line 32.

It is significant to note that the elements 26, 28, 30 and 31 represented by blocks in FIG. 1 may be contained within the housing 14 of the telephone TP or housed as a separate unit. Accordingly, the terminal TE may be manufactured in an integral form or may be accomplished by an auxiliary unit appropriately coupled to a telephone as exemplified by the telephone TP.

Considering the general operation of the terminal TE, removing the handpiece 18 from the cradle 16 provides an "off hook" signal to the processor 26 for setting a "monitor" mode from which either an inquiry may be formatted or the telephone TP may be used in a conventional manner. Accordingly, by removing the handpiece 18 from the cradle 16, the telephone TP is enabled for use as a conventional telephone instrument. Alternatively, to interface the inquiry processing computer P, after removing the handpiece 18 from the cradle 16, and touching keys 12 to place a call, the telephone key 12 designated by an asterisk ("*") or star is depressed to initiate internal operations within the terminal TE. As a consequence, the processor 26 establishes a pattern of switching configurations for the generation of an inquiry packet which is stored in the processor 26. Specifically, an inquiry format is determined and under control of the processor 26, the voice synthesizer 28 prompts a caller through the earphone 22 to input data using the key pad 10. The inquiry data is formulated within the processor 26 as a inquiry packet and may include several distinct fields.

With the completion of an inquiry data packet in the processor 26, the processor establishes a dial-up connection through the facility C to the inquiry processing computer P. The encoder/decoder apparatus 30 then is actuated by the processor 26 and the data packet is transmitted either through the DTMF apparatus 30 or the modem 31. Note that the modem 31 comprises optional structure in the disclosed embodiment. As explained above, the computer P responds with data signals which are communicated to the voice synthesizer 26 to provide the caller with a vocal response to the inquiry.

As indicated above, inquiries may take various forms and various results may be accomplished including a direct communication between the telephone TP and the manual terminal MT. Also, various specific inquiries may be involved as explained below.

Figure 2:
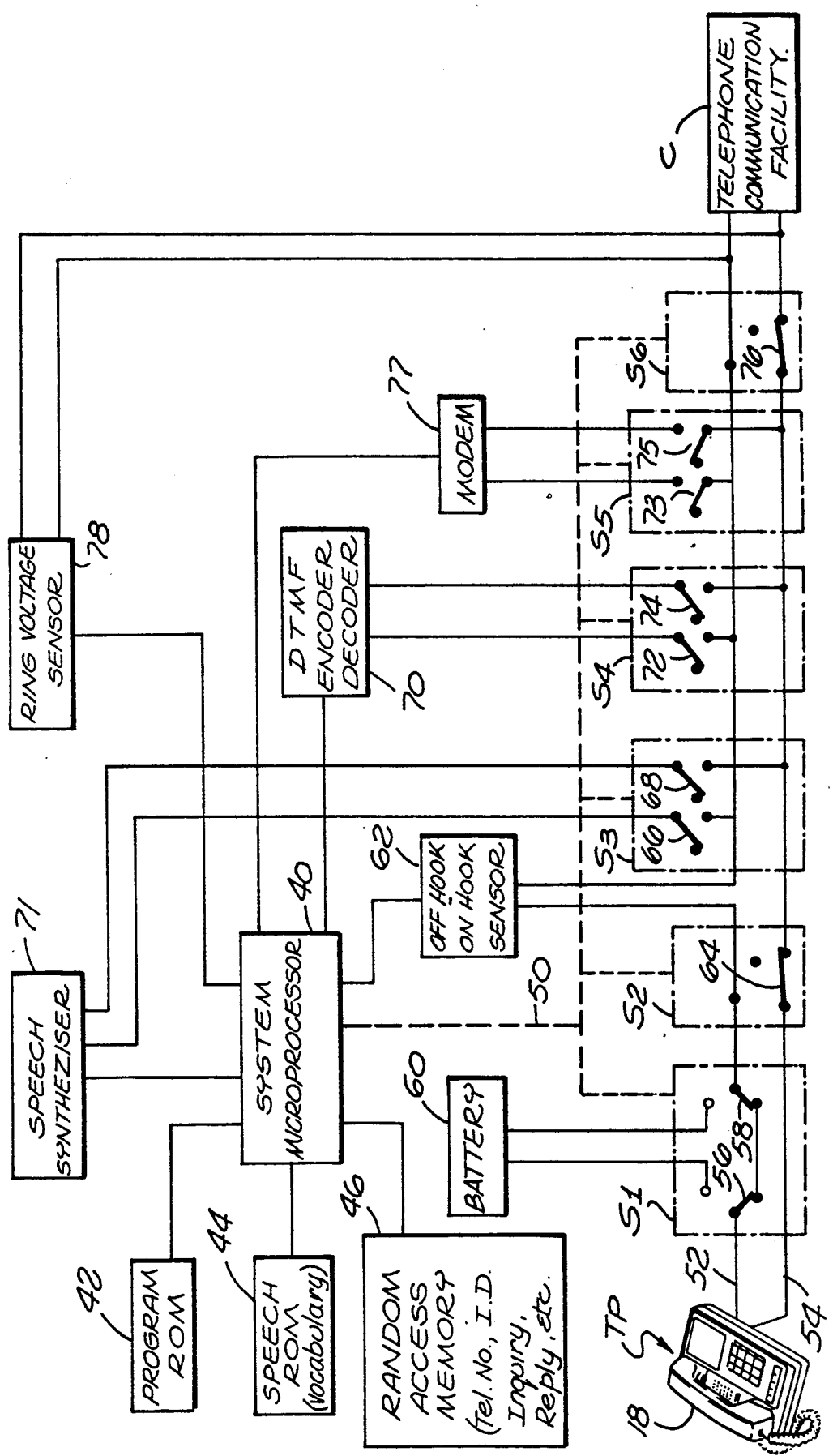
FIG. 2 is a block diagram showing the terminal of FIG. 1 in somewhat greater detail.

To consider the terminal TE in greater detail, reference will now be made to FIG. 2 showing the telephone TP (lower left) and the telephone communication facility C (lower right). As illustrated in FIG. 2, the additional components are shown in greater detail and in that regard the processor 26 includes a microprocessor 40, memory in the form of a program ROM 42, a speech ROM 44, and a random access memory 46, and further a series of switches illustrated as switch units S1, S2, S3, S4, S5 and S6. The switch units S1 through S6 are controlled by the microprocessor 40 as indicated by a dashed line 50. In an actual installation, the switches S1 through S6 would take the form of electronic switches controlled by the microprocessor 40 as well known in the art. However, for convenience of illustration and explanation, the switch units S1 through S6 are illustrated as electromechanical apparatus separate from the system microprocessor 40.

Generally, the switch units S1 through S6 couple various elements in the system of FIG. 2 to a pair of somewhat parallel lines 52 and 54 extending from the telephone TP to the telephone communication facility C. Consider now the specific connections of the switch units S1 through S6 as related to the lines 52 and 54.

The switch unit S1 includes a pair of double-throw single-pole switches 56 and 58. In the raised or upper position, the switches 56 and 58 couple a battery 60 into the line 52. In the lower position, the switches 56 and 58 simply close the line 52. Note that the line 52 couples the telephone TP to the telephone communication facility C through an off hook/on hook sensor 62.

The switch unit S2 comprises a single-pole single-throw switch 64 for closing the line 54 when in a lowered position and opening the line in a raised position.

The switch unit S3 includes a pair of single-pole single-throw switches 66 and 68 for connecting a voice synthesizer 71 across the lines 52 and 54 in the lowered position. In the raised position, the voice synthesizer 71 is isolated from the lines 52 and 54.

The switch unit S4 also includes a pair of single-pole single-throw switches for coupling an encoder/decoder unit 70 across the lines 52 and 54. Specifically, when the switches 72 and 74 are in an upper or raised position, the unit 70 is isolated from the lines 52 and 54. When the switches 72 and 74 are in the lowered position the unit 70 is coupled across the lines 52 and 54.

The switch unit S5 includes a pair of switches 73 and 75 for coupling a modem 77 between the lines 52 and 54 when in the raised position. Note that the modem 77 may be eliminated in certain embodiments with communication to and from the facility C to the microprocessor 40 passing through the DTMF unit 70. Note that the modem 77, the unit 70, the synthesizer 71 and the sensor 62, along with a sensor 78, are all coupled to the microprocessor 40.

The switch unit S6 incorporates a single-pole single-throw switch 76 for opening the line 54 adjacent to the telephone communication facility C. Specifically, in the lowered position the switch 76 closes the line 54 and in the raised position the line is open.

Between the switch unit S6 and the telephone communication facility C, the lines 52 and 54 are coupled to the ring voltage sensor 78. Specifically, the sensor 78 is coupled across the lines 52 and 54 and to the system microprocessor 70.

Considering the elements of FIG. 2 in somewhat greater detail, the system microprocessor 40 may take various forms; however, a Z80 microprocessor has been determined to be satisfactory. Other elements in the system of FIG. 2 may take well known forms functioning in accordance with well known principles of the art.

The switch configuration of the system as illustrated in FIG. 2 accommodates conventional use of the telephone TP. In that regard, note that the telephone TP is connected to the telephone communication facility C through the lines 52 and 54 isolated from all elements except the sensor 62 and the ring voltage sensor 36. Specifically, the switches are in the lowered position in the switch units S1, S2, S5 and S6 and in the raised position in the switch units S3 and S4.

As indicated above, the switch configurations or units S1–S6 are controlled by the microprocessor 40 and typically would be in an electronic form. Accordingly, when the telephone TP is used to initiate a call, the switch units S1 through S6 remain in the indicated configuration and conventional use of the telephone is accommodated. On the occurrence of an incoming call, the telephone communication facility C provides a ring voltage across the lines 52 and 54 which is detected by the ring voltage detector 78. As a result, a signal is provided to the microprocessor 40 indicating an incoming call and commanding conventional use of the telephone TP. Thus, the microprocessor 40 allows the switch units S1 through S6 to remain quiescent (idle mode) and ignores the signal produced by the off hook/on hook sensor 62 when the handpiece is lifted from the telephone TP. Consequently, an incoming call is accommodated.

As indicated above, other operations of the system involve interfacing the inquiry processing computer P (FIG. 1) as to obtain data. In that regard, the system of FIG. 1 may be variously programmed to accommodate a variety of interface operations. A detailed inquiry process is disclosed below wherein the computer P is interfaced to obtain financial information as relating to a bank check.

To accomplish an inquiry interface, a data packet is formulated for transmission to the processing computer. The format data packet might include: the telephone calling number for the computer P, the identification of the station for the terminal TE, the type of inquiry, the originating State of the inquiry, identification for the subject of the inquiry, the amount of a transaction or check, and so on. The data inquiry packet is composed from data that is resident in the terminal TE and from data provided by a caller actuating the keypad 10 (FIG. 1).

With the completion of an inquiry packet, telephone communication is established from the terminal TE (FIG. 1) to the computer P and the inquiry is transmitted. In response to the inquiry, the computer P may provide a reply after which the telephonic communication is terminated. The reply signals (from the computer) stored in the microprocessor 40 then actuate voice synthesizer 71 (FIG. 2) to announce the reply data through the telephone TP.

The voice synthesizer 71 receives vocabulary signals from the speech ROM 44 addressed by the reply data through the microprocessor 40. In that regard, the speech ROM 44 stores a vocabulary of synthesized speech terms for driving the voice synthesizer 71 on command. Accordingly, reply signals address speech terms for utilization by the synthesizer 71 to articulate or vocalize the reply data. For the credit check format as mentioned above, the following vocabulary stored in the speech ROM 44 has been determined to be adequate:

| Vocabulary for POS Transactions (Point of Sale) | | | | | | | |
|---|---|---|---|---|---|---|---|
| Zero | One | Two | Three | Four | Five | Six | Seven |
| Eight | Nine | | | | | | |
| "A" | "B" | "C" | "D" | "E" | "F" | "G" | "H" | "I" | "J" |
| "K" | "L" | "M" | "N" | "O" | "P" | "Q" | "R" | "S" | "T" |
| "U" | "V" | "W" | "X" | "Y" | "Z" | | |
| Card | | Micr | ID | | State | | License |
| Birth | | Date | Check | | Number | | Amount |
| Re | | Enter | Pick | | Up | | Transaction |
| Cents | | Hold | For | | Call | | Center |
| Transfer | | Approval | Of | | Declined | | Dollars |
| And | | Credit | Touch | | Or | | Expiration |
| Authorization | | | For | | An | | A |

In view of the above preliminary descriptions, comprehensive understanding of the system and an exemplary operating program may now best be accomplished by assuming certain conditions and explaining the detailed operations associated with the exemplary format inquiry and response. Accordingly, assume the system of FIGS. 1 and 2 is programmed to accommodate a POS (point of sale) inquiry, specifically as related to a bank check or credit transaction. Further assume an operator at the telephone TP who is prepared to direct the inquiry and supply the requisite data.

With the removal of the handpiece 18 from the telephone TP, the off hook/on hook sensor 62 provides a signal to the microprocessor 40. As a consequence, the terminal shifts from an idle mode to enter a ring mode which accommodates either conventional use of the telephone TP or an inquiry to a data computer. In the monitoring mode, the switch S4 is altered from the position illustrated in FIG. 2. Specifically, the switches 72 and 74 are closed connecting the unit 70 across the lines 52 and 54 pending an indication of the use of the telephone TP. If the user or operator actuates any key 12 on the keypad 10 except the key designated asterisk "*", conventional use of the telephone is commanded.

Note that if a key 12 other than the key designated "*" is touched, the terminal returns to the idle mode. Conversely, if the user actuates the key 12 designated asterisk "*" the unit 70 is triggered to signal the microprocessor 40 accordingly. As a consequence, the system enters an "inquiry" mode with attendant switch changes.

Advancing from the monitoring mode to the inquiry mode, isolates the telephone from the telephone communication facility C. Specifically, changes occur in the switch units S1, S3 and S6. Specifically, the switches 56 and 58 are raised to provide drive power from the battery 60 in view of the isolation from the telephone communication facility C. The switches 66 and 68 in the switching unit S3 are moved to the lowered position to be closed, coupling the voice synthesizer 71 across the lines 52 and 54. Finally, the switch 76 in the switching unit S6 is open to isolate the terminal TE.

If the modem 77 is to communicate with the microprocessor 40, the switches 73 and 75 also must be closed. However, as indicated above, the inquiry forming communication may be implemented through the decoder 70.

In the inquiry mode, the telephone TP is actuated by the battery 60 to communicate with the voice synthesizer 71 and the unit 70. Accordingly, the system is in the configuration to formulate a data inquiry packet.

The formulation of a data packet may involve different procedures and patterns; however, to consider an example, after touching the telephone key 12 designated asterisk "*" the user might next touch the key designated "A" to select an inquiry directed to the computer P. Upon that occurrence, the microprocessor 40 would fetch the telephone number for the computer P from the memory 46 as an initial element or field of the data packet. Concurrently, the microprocessor 40 would fetch data for the program from the program ROM 42 for driving the voice synthesizer 71. For example, the user might be asked: "For a check inquiry touch 1. For a credit card inquiry touch 2."

Speech terms for the instruction or cue are provided from the ROM 44 by the microprocessor 40 to the speech synthesizer 71. Responsive signals from the keypad 10 of the telephone TP are provided through the unit 70 to the microprocessor 40. Accordingly, instructions are provided to the user at the telephone TP to generate responses on the keypad 10 to formulate the details of the inquiry. Note, as indicated above, as the terminal TE is isolated the time required to formulate the data packet is relatively unimportant.

Essentially, the program ROM 42 functions with the microprocessor 40 to interface the telephone TP and thereby develop a registered inquiry. The interface is facilitated through the speech synthesizer 71 and the unit 70.

With the completion of a stored data packet in the microprocessor 40, the system enters a "communicate" mode. In the communicate mode, the microprocessor 40 transmits the inquiry data packet through the unit 70 (or the modem 77) to the telephone communication facility C. In the communicate mode, the switch unit S4 couples the unit 70 to the telephone communication facility with the switches 72 and 74 being closed along with the switch 76 in the switch unit S6. Other switches in the terminal TE are open isolating the telephone TP and other elements of the system. Note that the open switch 64 in the switch unit S2 disconnects the telephone TP so that tones on the line do not blast the operator's ear.

With the terminal TE in the communicate mode, the data inquiry packet is transmitted through the telephone communication facility C to the inquiry processing computer P. Note that the transmission may be programmed to accommodate timing aspects of the interface. It is also noteworthy that operation of the switch units S1 through S6 is sequenced to some extent in entering the communicate mode. For example, the switch unit S6 is first open for a short interval then closed actuating the telephone facility C to reestablish communication.

Once the data packet is communicated from the terminal TE to the computer P, either a computerized reply will be provided or the caller will be connected to the manual terminal MT. If the circumstances dictate a manual interface, an appropriate signal is provided from the computer P to the terminal TE with the consequence that the switches S1-S2 are placed in a "vocal communication" mode coinciding to the "idle" mode. Specifically, the switch units S1 through S6 are set as illustrated in FIG. 2.

Note that the caller may be alerted to a manual interconnect by an interim mode in which the switching unit S3 is briefly closed to provide speech signals from the synthesizer 71 to the telephone TP. For example, the speech signals might drive the telephone TP to announce: "Hold for transfer".

In the event the system establishes a person-to-person communication from the telephone TP to the manual terminal MT, the communication will continue until terminated by the caller. Note that when the handpiece 18 is returned to an on-hook position, the terminal TE simply remains in the idle mode.

The more typical response from the computer P is anticipated to be in the form of reply data. For example, in the event of an inquiry directed to a credit card or check, the reply may simply take the form of an approval or a rejection. Of course, identification data also may be supplied. The reply information is received through the telephone communication facility C and again is passed either through the DTMF unit 70 or the modem 77 to be stored in the memory 46. The terminal TE then disconnects from the telephone communication facility and the terminal advances to the "report" mode.

In the report mode, the battery 60 energizes the terminal TE which is isolated from the facility C and operates to announce the results of the inquiry. Specifically, the switch unit S1 has the switches 56 and 58 in the upper position coupling the battery 60 into the circuit of the terminal TE. The switch unit S2 is in the lower position closing the line 54. The switch unit S3 is in the lowered position coupling the speech synthesizer 71 across the lines 52 and 54. The switch units S4 and S5 are in the upper position decoupling the unit 70 and the modem 77. Also, the switch unit S6 is in the upper position to isolate the terminal TE from the facility C.

In the report configuration, the reply is communicated by the speech synthesizer 71 driven by the reply data stored in the microprocessor 40. Following the communication of the reply repeatedly, during the report mode, the terminal TE will return to the idle mode when on-hook, ready for subsequent use.

For convenient reference, the various positions of the switches in the switch units S1 through S6 are shown in a chart as follows. Specifically, for each of the modes, the states of the switches in the switch units are indicated.

| Mode | Switch States | | | | | |
| --- | --- | --- | --- | --- | --- | --- |
| | S1 | S2 | S3 | S4 | S5 | S6 |
| Idle | lower | lower | upper | upper | lower | lower |
| Monitor | lower | lower | upper | lower | lower | lower |
| Inquiry | upper | lower | lower | lower | lower | upper |
| Communicate | upper | upper | upper | lower | upper | lower |
| Vocal Comm. | lower | lower | upper | upper | lower | lower* |
| Report | upper | lower | lower | upper | lower | upper |

Figure 3:
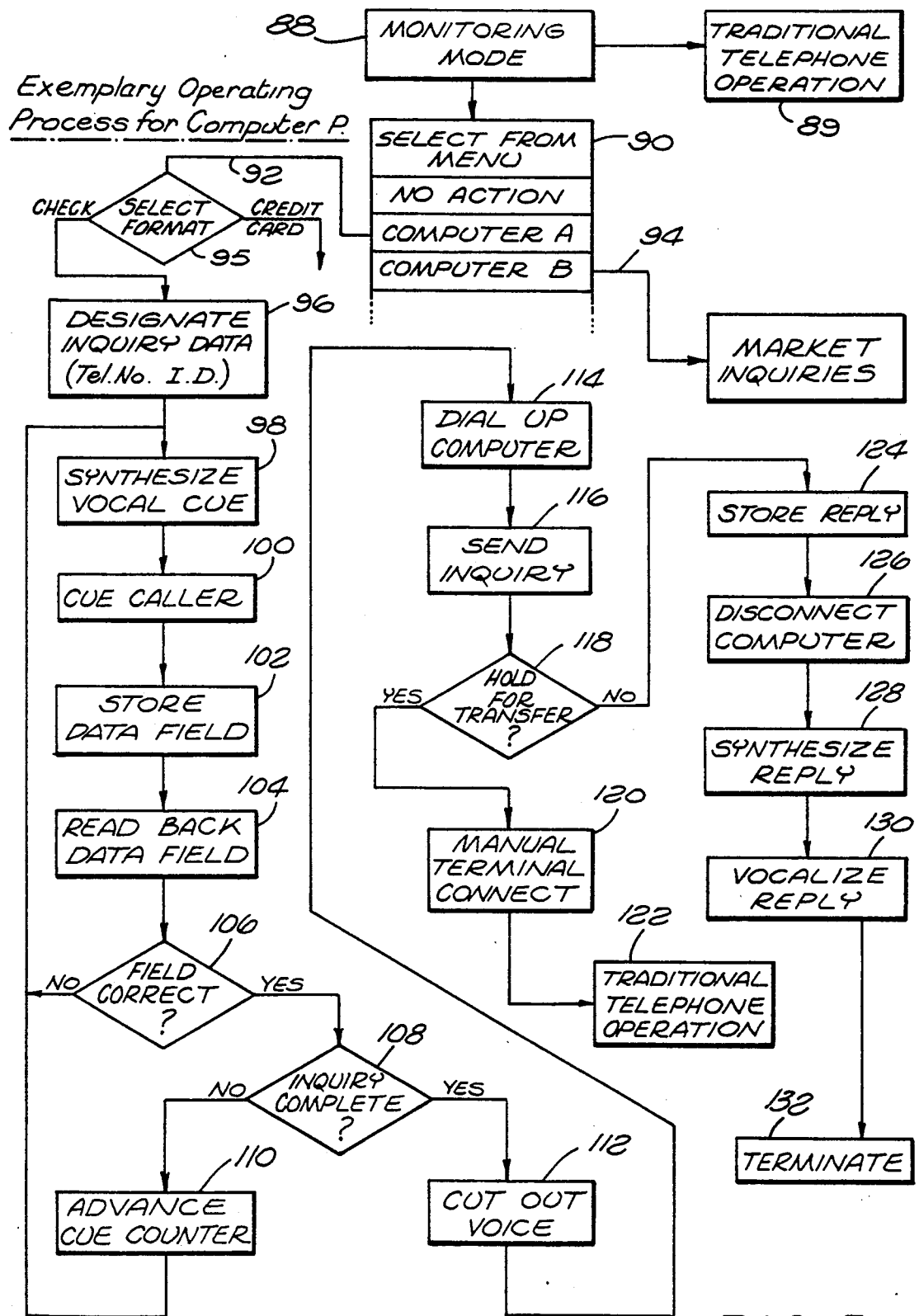
FIG. 3 is a flow diagram of an operating process for the system of FIG. 1.

Turning now to the process steps, reference will be made to FIG. 3 illustrating three operations. As indicated above, when the handpiece 18 is taken off hook, the terminal TE enters a monitoring mode as represented by the block 88. If the user does not enter an asterisk "*" as the initial digit, the terminal returns to the idle mode and traditional telephone use may follow as indicated by block 89.

Alternatively, from the "monitor" mode, entry of an asterisk "*" prompts a menu as illustrated by the block 90. The alternative selections include POS inquiries as indicated by a path 92 or market inquiries as indicated by a path 94. The detailed operation of the system to accommodate POS inquiries pursuing the path 92 will now be explained.

The initial query block 95 in the path 92 involves a determination of whether the inquiry is directed to a check or credit card. The detailed operation involves the microprocessor 40 (FIG. 2) fetching signals for the cue terms from the speech ROM 44 and driving the speech synthesizer 71. Accordingly, the caller is cued or instructed to select the nature of the transaction to be pursued.

Assume, for example, that the caller desires to pursue a "check" inquiry, and accordingly touches the key 12 designated "1". The resulting signal is supplied through the unit 70 to provide a command signal for the microprocessor 40. As a result, the "check" inquiry format is associated with the microprocessor 40 from the program ROM 42. Specifically, certain data fields are loaded in the microprocessor 40 as indicated by the block 96 (FIG. 3).

Next, the caller is cued to enter specific data. Specifically, cues are synthesized as indicated by the block 98 and as a result the caller is cued as indicated by the block 100. The information provided by the caller is stored in the microprocessor 40 as indicated by the block 102, then tested by an oral confirmation as indicated by the block 104. If the repeated data is not confirmed, the process returns to block 98 in an effort to obtain the correct data as indicated by the query block 106. Confirmed data advances the process to the query block 108 involving a test of whether or not the data packet is complete.

If the inquiry is not complete, a cue counter (not shown) is advanced as indicated by the block 110 and the cycle is repeated to establish another field of the data packet. To summarize, the process involves four steps: synthesize a vocal cue (block 98) involving the speech ROM 44 (FIG. 2) and the microprocessor 40; cue the caller (block 100) involving a speech synthesizer 71 and the microprocessor 40; store the data field (block 102) involving the telephone TP, the unit 70 and the microprocessor 40; and read back the data field (block 104) and involving the microprocessor 40 and the speech synthesizer 71.

It is noteworthy that the microprocessor 40 may incorporate the capability to detect errors in the fields of provided data. In that regard, specific digits of individual fields may be checked for format. Also, callers may be afforded an opportunity to abort operations to supply data by resetting to an entry stage. In any event, in an illustrative system, the following data fields are established as the data packet: State; License Number or I.D. Number; Birthdate; Amount; Check Number.

With the data packet complete to prompt a positive exit from the query block 108 (FIG. 3) the telephone TP is isolated as indicated by the block 112. The switching operation of the switch unit S2 was explained above.

After isolating the telephone TP, the terminal TE is coupled to the telephone communication facility C (switching unit S6) and the computer P is dialed as indicated by the block 114. Upon establishing a connection, the inquiry is transmitted as indicated by the block 116 for action by the computer.

As indicated by the block 118, the action by the computer may involve either an automated response or a transfer to the manual terminal (FIG. 1). As illustrated in FIG. 3, a manual interface involves the manual terminal connection as represented by the block 120 followed by traditional telephonic operation as indicated by the block 122.

The alternative of an automated reply is pursued from the negative side of the block 118. Specifically, the reply is received through the telephone communication facility C passed to the system microprocessor 40 for storage as indicated by the block 124. The communication is then severed as indicated by the block 126 terminating the telephone connection interval.

Within the terminal TE, voice signals for synthesizing the reply are formulated as indicated by the block 128. Specifically, the speech ROM 44 is addressed to provide the appropriate response terms which are supplied to the speech synthesizer 71. Next, the speech is synthesized to vocalize a reply through the switch S3 as indicated by the block 130 (FIG. 4). The caller thus hears the reply and acts accordingly. With regard to the equipment, the operation is then terminated as indicated by the block 132, the system returning to an idle state.

In view of the above explanation of an exemplary system and an exemplary process, it will be appreciated that embodiments of the present invention may be employed in many different applications to formulate and transmit inquiries and receive replies by use of the telephone. While certain exemplary structures and operations have been described herein, the appropriate scope hereof is deemed to be in accordance with the claims as set forth below.

What is claimed is:

1. An auxiliary terminal apparatus for use in association with a telephone unit including an earpiece, a keypad and first telephone circuits for operation with a dial-up system to formulate an inquiry for communication with a central processor, said auxiliary telephone apparatus comprising:

a vocabulary memory for storing signal representations of select words;

a voice synthesizer for receiving said signal representations of select words to provide voice signals; and programmable control means including switch means for, transferring said signal representations from said vocabulary memory to said voice synthesizer and coupling said voice synthesizer to said telephone earpiece to instruct a caller according to a specific format to input data using said keypad, transferring inquiry signals from said keypad to formulate an inquiry, and actuating the second telephone circuits to dial-up said central processor to communicate the inquiry and thereafter to receive a response from said central processor through said voice synthesizer for providing a vocal response to said caller.

2. An auxiliary terminal apparatus according to claim 1 wherein said programmable control means includes a switching structure to isolate said voice synthesizer from lines extending from the telephone unit to an associated telephone communication facility.

3. An auxiliary terminal apparatus according to claim 2 wherein said switching structure couples said voice synthesizer to said earpiece.

4. An auxiliary terminal apparatus according to claim 1 further including an encoder/decoder for coupling to said keypad.

5. An auxiliary terminal apparatus according to claim 2 further including an encoder/decoder for coupling to said keypad and wherein the switching structure couples the encoder/decoder to said keypad.

6. An auxiliary terminal apparatus according to claim 1 further including a modem for coupling to said telephone circuits.

7. An auxiliary terminal apparatus according to claim 2 further including a modem for coupling to said telephone circuits and wherein said switching structure couples said modem to said telephone circuits.

8. An auxiliary terminal apparatus according to claim 1 wherein said programmable control means formulates an inquiry from data resident in the terminal apparatus and from data input by said caller with said keypad.

9. A telephone instrument for operation through a dial-up system to formulate an inquiry for communication with a central processor and receive a reply, comprising:
  an earpiece;
  a dialing keypad;
  telephone connection and processing circuits;
  a vocabulary memory for storing signal representations of select words;
  a voice synthesizer for receiving said signal representations of select words to provide voice signals; and
  control means including switch means for selecting signal representations from said vocabulary memory, coupling said voice synthesizer to said telephone earpiece to instruct a caller according to a specific format to input data using said keypad, receiving inquiry signals from said keypad to formulate an inquiry, and actuating said telephone circuits to dial-up said central processor to communicate said inquiry and thereafter to receive a response from said central processor through said voice synthesizer for providing a vocal response to said caller.

* * * * *